United States Patent
Leufgens et al.

(10) Patent No.: US 9,255,197 B2
(45) Date of Patent: Feb. 9, 2016

(54) POLYMER FOAM

(75) Inventors: Markus Leufgens, Victoria (AU); John Scheirs, Victoria (AU)

(73) Assignee: TRISTANO PTY LTD, Victoria (AU)

( * ) Notice: Subject to any disclaimer, the term of this patent is extended or adjusted under 35 U.S.C. 154(b) by 361 days.

(21) Appl. No.: 13/816,893

(22) PCT Filed: Aug. 12, 2011

(86) PCT No.: PCT/AU2011/001036
§ 371 (c)(1),
(2), (4) Date: Mar. 11, 2013

(87) PCT Pub. No.: WO2012/019244
PCT Pub. Date: Feb. 16, 2012

(65) Prior Publication Data
US 2013/0196103 A1 Aug. 1, 2013

(30) Foreign Application Priority Data

Aug. 13, 2010 (AU) ................. 2010903646

(51) Int. Cl.
| | |
|---|---|
| *C08L 3/02* | (2006.01) |
| *C08J 9/00* | (2006.01) |
| *C08J 9/10* | (2006.01) |
| *C08L 23/06* | (2006.01) |
| *C08L 23/08* | (2006.01) |
| *C08K 5/01* | (2006.01) |
| *C08K 5/053* | (2006.01) |
| *C08L 23/02* | (2006.01) |
| *C08L 91/06* | (2006.01) |

(52) U.S. Cl.
CPC ............. *C08L 3/02* (2013.01); *C08J 9/0061* (2013.01); *C08J 9/103* (2013.01); *C08L 23/06* (2013.01); *C08L 23/0815* (2013.01); *C08J 2205/052* (2013.01); *C08J 2303/02* (2013.01); *C08J 2323/02* (2013.01); *C08J 2423/08* (2013.01); *C08J 2491/06* (2013.01); *C08K 5/01* (2013.01); *C08K 5/053* (2013.01); *C08L 23/02* (2013.01); *C08L 23/0853* (2013.01); *C08L 23/0869* (2013.01); *C08L 91/06* (2013.01); *C08L 2205/025* (2013.01); *Y10T 428/1376* (2015.01)

(58) Field of Classification Search
CPC ........... C08L 91/06; C08L 3/02; C08L 23/06; C08L 23/0815; C08L 23/02; C08L 23/0853; C08L 23/0869; C08J 9/0061; C08J 9/103; C08J 2205/052; C08J 2303/02; C08J 2323/02; C08J 2423/08; C08J 2491/06; C08K 5/01; C08K 5/053; Y10T 428/1376
See application file for complete search history.

(56) References Cited

U.S. PATENT DOCUMENTS

| | | |
|---|---|---|
| 5,801,207 A | 9/1998 | Bastioli et al. |
| 7,701,249 B2 | 4/2010 | Whetsel |
| 2003/0100635 A1 | 5/2003 | Ho et al. |

FOREIGN PATENT DOCUMENTS

| | | |
|---|---|---|
| CN | 1099399 A | 3/1995 |
| WO | WO 2010/012041 A1 | 2/2010 |
| WO | WO 2010/111899 A1 | 10/2010 |
| WO | WO 2011/009165 A1 | 1/2011 |

OTHER PUBLICATIONS

International Search Report, PCT appl. No. PCT/AU2011/001036, 4 pages (Sep. 20, 2011).
Supplementary European Search Report, EP appl. No. 11815920.1, 6 pages (Nov. 28, 2013).
Willet et al., "Processing and properties of extruded starch/polymer foams," Polymer 43:5935-5947 (2002).
Written Opinion of the International Searching Authority, PCT appl. No. PCT/AU2011/001036, 7 pages (Sep. 20, 2011).
"6.1.2 Starch polyethylene plastic," in Starch Chemicals and Their Applications, Deng Yu, Ed., p. 239, 1st edition, Chemical Industry Press (2002).

*Primary Examiner* — Michael C Miggins
(74) *Attorney, Agent, or Firm* — Cooley LLP

(57) ABSTRACT

The present invention relates to foam comprising thermoplastic starch, polyolefin, polyolefin wax, ethylene vinyl alkanoate copolymer, and ethylene acrylic copolymer, and also to a method of preparing the same.

16 Claims, No Drawings

POLYMER FOAM

This application is a national stage entry of PCT/AU2011/001036, filed on Aug. 12, 2011, which claims the benefit of Australian Patent Application No. 2010903646, filed on Aug. 13, 2010, each of which is incorporated herein by reference in its entirety.

FIELD OF THE INVENTION

The present invention relates in general to polymer foams, to a foamable polymer composition, and to a method of producing the same. The foams of the invention comprise polyolefin.

BACKGROUND OF THE INVENTION

Foams comprising polyolefins are used extensively in the packaging and construction industries, and are typically produced by extrusion processes that are well known in the art.

In such processes, a polyolefin resin is introduced to an extruder, typically in the form of pellets. Common polyolefins employed for making the foams include polyethylene, such as low density polyethylene (LDPE), and polypropylene (PP). Once in the extruder, the polyolefin melts and a blowing agent is admixed with the molten polyolefin (typically under high pressure). The blowing agent may be introduced to the extruder with or separate from the polyolefin. The extruder then pumps the melt mixture (i.e. the molten polyolefin and blowing agent) through a die and into a region of reduced temperature and pressure (relative to the temperature and pressure within the extruder).

Generally, the region of reduced temperature and pressure is at ambient conditions. Upon the melt mixture being exposed to reduced pressure, the blowing agent promotes formation of a plurality of gas bubbles, which upon solidification of the molten polymer give rise to a plurality of cells within the polymer to thereby form the foam.

Depending upon the conditions/reagents employed, the resulting foam may have an open cell or closed cell structure. Open cell structured foams have inter-connected pores and generally exhibit a relatively low compressive strength. Closed cell structured foams have pores that are isolated within the polymeric matrix and are therefore not inter-connected. Such foams typically exhibit a relatively high compressive strength.

Polyolefins are particularly well suited for producing in an effective and efficient manner foamed products that exhibit excellent properties. However, with an ever increasing emphasis on sustainability and the environment, there is a concerted effort mounting to develop foam polymer products that are less reliant upon using petroleum derived polymers such as polyolefins.

Foamed products made from renewable materials such as starch have been developed. However, such products generally exhibit inferior properties compared with their polyolefin counterparts.

Polyolefin/starch blends have also been developed. However, combining relatively hydrophilic starch with relatively hydrophobic polyolefins to produce a polymer blend with good mechanical properties has proven difficult in practice. In particular, melt processing starch with a polyolefin generally results in the formation of a polymer blend having a multi-phase discontinuous morphology. Such morphologies are typically unstable and exhibit high interfacial tension, the likes of which are not particularly suitable for use in the formation of foam products.

An opportunity therefore remains to address or ameliorate one or more disadvantages or shortcomings associated with conventional foams and/or their production, or at least to provide a useful alternative foam product and/or method of production.

SUMMARY OF THE INVENTION

The present invention therefore provides a foam comprising thermoplastic starch, polyolefin, polyolefin wax, ethylene vinyl alkanoate copolymer and ethylene acrylic copolymer.

It has now been found that foam in accordance with the invention can be prepared in an effective and efficient manner, and exhibits excellent properties. Furthermore, the foam has a sustainable and renewable content (i.e. thermoplastic starch) that advantageously imparts a reduced carbon footprint relative to a polyolefin foam that consists essentially of polyolefin.

The present invention also provides a foamable polymer composition comprising thermoplastic starch and/or its constituent components, polyolefin, polyolefin wax, ethylene vinyl alkanoate copolymer, and ethylene acrylic copolymer.

The present invention further provides a method of producing a foam, the method comprising melt processing a foamable polymer composition in the presence of a blowing agent, wherein the foamable polymer composition comprises thermoplastic starch and/or its constituent components, polyolefin, polyolefin wax, ethylene vinyl alkanoate copolymer and ethylene acrylic copolymer.

In one embodiment of the method, the foamable polymer composition is prepared by melt processing with a polyolefin a melt blended composition comprising thermoplastic starch, polyolefin, polyolefin wax, ethylene vinyl alkanoate copolymer, and ethylene acrylic copolymer.

Further aspects of the invention are described in more detail below.

DETAILED DESCRIPTION OF THE INVENTION

The present invention provides for a foam. By the term "foam" is meant a polymeric material having an expanded cellular structure. The foam in accordance with the invention may have an open cell and/or a closed cell structure.

In one embodiment, the foam in accordance with the invention has a closed cell structure.

A foam in accordance with the invention comprises thermoplastic starch (TPS). Those skilled in the art will appreciate that TPS is a destructured form of starch comprising one or more plasticisers.

Starch is found chiefly in seeds, fruits, tubers, roots and stem pith of plants, and is a naturally derived polymer made up of repeating glucose groups linked by glucosidic linkages in the 1-4 carbon positions. Starch consists of two types of alpha-D-glucose polymers: amylose, a substantially linear polymer with molecular weight of about $1 \times 10^5$; and amylopectin, a highly branched polymer with very high molecular weight of the order $1 \times 10^7$. Each repeating glucose unit typically has three free hydroxyl groups, thereby providing the polymer with hydrophilic properties and reactive functional groups. Most starches contain 20 to 30% amylose and 70 to 80% amylopectin. However, depending on the origin of the starch the ratio of amylose to amylopectin can vary significantly. For example, some corn hybrids provide starch with 100% amylopectin (waxy corn starch), or progressively higher amylose content ranging from 50 to 95%. Starch usually has a water content of about 15 wt %. However, the starch can be dried to reduce its water content to below 1 wt %. An amount of starch per se used in accordance with the invention is intended to include the mass of water associated with the starch.

Prior art processes for melt blending starch with polyolefins can be subject to a requirement of using starch with a low water content (e.g. below about 1 wt %). The process in accordance with the present invention can advantageously be performed using starch having a water content from about 0.3 wt % to about 15 wt %, for example from about 0.3 wt % to about 5 wt %, or from about 5 wt % to about 15 wt %, or from about 10 wt % to about 15 wt %.

Starch typically exists in small granules having a crystallinity ranging from about 15 to 45%. The size of the granules may vary depending upon the origin of the starch. For example, corn starch typically has a particle size diameter ranging from about 5 µm to about 40 µm, whereas potato starch typically has a particle size diameter ranging from about 50 µm to about 100 µm.

This "native" or "natural" form of starch may also be chemically modified. Chemically modified starch includes, but is not limited to, oxidised starch, etherificated starch, esterified starch, cross-linked starch or a combination of such chemical modifications (e.g. etherificated and esterified starch). Chemically modified starch is generally prepared by reacting the hydroxyl groups of starch with one or more reagents. The degree of reaction, often referred to as the degree of substitution (DS), can significantly alter the physiochemical properties of the modified starch compared with the corresponding native starch. The DS for a native starch is designated as 0 and can range up to 3 for a fully substituted modified starch. Depending upon the type of substituent and the DS, a chemically modified starch can exhibit considerably different hydrophilic/hydrophobic character relative to native starch.

Both native and chemically modified starch can be converted into TPS by means well known in the art. For example, native or chemically modified starch may be melt processed with one or more plasticisers. Polyhydric alcohols are generally used as plasticisers in the manufacture of TPS.

Reference herein to a wt % of TPS is therefore intended to include the collective mass of both the starch and plasticiser constituent components of the TPS.

The starch from which the TPS may be derived includes, but is not limited to, corn starch, potato starch, wheat starch, soy bean starch, tapioca starch, hi-amylose starch or combinations thereof.

Where the starch is chemically modified, it will generally be etherificated or esterified. Suitable etherificated starches include, but are not limited to, those which are substituted with ethyl and/or propyl groups. Suitable esterified starches include, but are not limited to, those that are substituted with acetyl, propanoyl and/or butanoyl groups.

In one embodiment of the invention, the starch used to prepare the TPS is native starch, for example, native starch selected from one or more of corn starch, potato starch, wheat starch, soy bean starch, tapioca starch, and hi-amylose starch.

In one embodiment of the invention, the starch used to prepare the TPS is corn starch or corn starch acetate having a DS>0.1.

The TPS will generally also comprise one or more polyhydric alcohol plasticisers. Suitable polyhydric alcohols include, but are not limited to glycerol, ethylene glycol, propylene glycol, ethylene diglycol, propylene diglycol, ethylene triglycol, propylene triglycol, polyethylene glycol, polypropylene glycol, 1,2-propanediol, 1,3-propanediol, 1,2-butanediol, 1,3-butanediol, 1,4-butanediol, 1,5-pentanediol, 1,6-hexanediol, 1,5-hexanediol, 1,2,6-hexanetriol, 1,3,5-hexanetriol, neo-pentyl glycol, trimethylol propane, pentaerythritol, sorbitol, xylitol, mannitol and the acetate, ethoxylate, and propoxylate derivatives thereof.

In one embodiment, the TPS comprises glycerol and/or sorbitol plasticisers.

In certain aspects of the invention, reference is made to TPS and/or its "constituent components". For example, there is provided a foamable polymer composition comprising thermoplastic starch and/or its constituent components, polyolefin, polyolefin wax, ethylene vinyl alkanoate copolymer, and ethylene acrylic copolymer.

By the "constituent components" of TPS is meant the individual ingredients that are used to prepare TPS (e.g. starch and one or more plasticisers as herein described). Bearing in mind that TPS is prepared by melt blending starch and one or more plasticisers, a melt blended composition comprising TPS may itself be prepared using preformed TPS (i.e. TPS that has previously been prepared by melt blending starch and one or more plasticisers), or the TPS may be prepared from its constituent components during formation of the melt blended composition (i.e. in situ).

The plasticiser content of the TPS will generally range from about 5 wt % to about 50 wt %, for example from about 10 wt % to about 40 wt %, or from about 10 wt % to about 30 wt %, relative to the combined mass of the starch and plasticiser components.

The foam in accordance with the invention comprises polyolefin. Polyolefins that may be used in accordance with the invention include polyethylene homopolymer or copolymer, or polypropylene homopolymer or copolymer.

Examples of suitable polyethylenes include very low density polyethylene (VLDPE), LDPE, linear low density polyethylene (LLDPE), medium density polyethylene (MDPE), and high density polyethylene (HDPE).

In one embodiment of the invention, the foam comprises LDPE and/or LLDPE.

LDPE is generally characterised as having a density in the range of 0.910 g/cm$^3$ to 0.940 g/cm$^3$. LDPE that may be used in accordance with the invention includes, but is not limited to, that having a melt flow index (MFI) at 190° C./2.16 kg of about 0.2 g/10 min to about 20 g/10 min.

LLDPE is generally characterised as having a density ranging from 0.915 g/cm$^3$ to 0.925 g/cm$^3$. LLDPE that may be used in accordance with the invention includes, but is not limited to, that having a MFI at 190° C./2.16 kg of about 0.4 g/10 min to about 5 g/10 min.

Polypropylene that may be used in accordance with the invention includes atactic, isotactic, and syndiotactic polypropylene. The polypropylenes will generally have a MFI at 230° C./2.16 kg of about 1 to about 32, and a density ranging from about 0.880 g/cm$^3$ to about 0.930 g/cm$^3$.

Unless otherwise specified, reference herein to a density or MFI is intended to mean a density or melt flow index determined in accordance with ASTM D792 and ASTM D1238, respectively.

Polyolefins suitable for use in accordance with the invention also include propylene/ethylene copolymers and copolymers of ethylene or propene with one or more α-olefins (e.g. C1-C8 α-olefins).

The polyolefins used in accordance with the invention include those prepared using Ziegler Natter and metallocene catalysts.

The foam in accordance with the invention may comprise one or a number of different polyolefins. Where the foam comprises two or more polyolefins, the wt % of polyolefin in the foam is intended to be based on the total polyolefin content.

The foam in accordance with the invention further comprises polyolefin wax. The expression "polyolefin wax" is intended to be distinguished from a polyolefin per se. In particular, polyolefins are characterised by a relatively high number average molecular weight (i.e. Mn>about 100,000-200,000) and polyolefin wax is defined by a relatively low number average molecular weight (i.e. Mn≤about 7,000).

Reference herein to Mn is that as measured by gel permeation chromatography (GPC).

The polyolefin wax may be prepared by conventional means such as thermal or chemical degradation of a polyolefin, the partial polymerisation (i.e. oligomerisation) of olefins, or by a Fischer Tropsch process.

In one embodiment, the polyolefin wax has a Mn ranging from about 1,000 to about 7,000.

The polyolefin wax will generally be a homopolymer or copolymer of ethene, propene and one or more α-olefins (e.g. C1-C8 α-olefins).

In one embodiment, the polyolefin wax is a polyethylene wax.

For avoidance of any doubt, the polyolefin wax content of the foam in accordance with the invention should not be considered to form part of the polyolefin content of the foam.

The polyolefin wax may also be substituted with one or more polar moieties. For example, the polyolefin wax may be an oxidised polyolefin wax.

In one embodiment, the polyolefin wax has a melt viscosity at 120° C. ranging from about 100 mm$^2$/s to about 1200 mm$^2$/s, or about 120 mm$^2$/s to about 430 mm$^2$/s, as measured according to ASTM 2162.

In one embodiment, the polyolefin wax has a melting point or a melting range greater than about 95° C.

In a further embodiment, the polyolefin wax has a melting point or a melting range falling within about 95° C. to about 120° C.

Reference to the melting point or melting range of the polyolefin wax herein is intended to be that measured by Differential Scanning calorimetry (DSC) at a heat rate of 10° C./min according to ASTM 3417.

The foam in accordance with the invention further comprises ethylene vinyl alkanoate copolymer. The alkyl radical in the alkanoate moiety will generally have from 1 to 6 carbon atoms. Examples of suitable ethylene vinyl alkanoate copolymers include ethylene vinyl acetate, ethylene vinyl propionate, ethylene vinyl butyrate, ethylene vinyl isobutyrate, ethylene vinyl valerate, ethylene vinyl caproate, and combinations thereof.

In one embodiment, the ethylene vinyl alkanoate copolymer is ethylene vinyl acetate (EVA).

When used, the EVA will generally have a vinyl acetate content of grater than about 7%, for example ranging from about 7% to about 18%, or from about 9% to about 14%.

The foam in accordance with the invention also comprises ethylene acrylic copolymer. By "ethylene acrylic copolymer" is meant a polymer derived from the polymerisation of ethylene monomer and at least one monomer selected from (meth)acrylic acid and alkyl (meth)acrylate. By the expression "(meth)acrylic acid" is meant acrylic acid or methacrylic acid. Similarly, by the expression "(meth)acrylate" is meant acrylate or methacrylate. In the context of the alkyl (meth)acrylate, the "alkyl" will generally be a C1 to C10 alkyl, or a C1 to C4 alkyl.

Suitable examples of ethylene acrylic copolymer include ethylene acrylic acid, ethylene methacrylic acid, ethylene methyl (meth)acrylate, ethylene ethyl (meth)acrylate, ethylene propyl (meth)acrylate, ethylene N-butyl meth(acrylate), ethylene iso-butyl (meth)acrylate, ethylene 2-ethyl hexyl (meth)acrylate, or combinations thereof.

In one embodiment, the ethylene acrylic copolymer is ethylene acrylic acid copolymer (EAA).

EAA used in accordance with the invention will generally have a % acid value (as determined by ASTM D4094-00) of greater than about 7%, for example greater than or equal to about 9%.

EAA used in accordance with the invention will generally have a MFI at 190° C./2.16 kg of greater than about 5 g/10 min, for example ranging from about 10 g/10 min to about 30 g/10 min, or from about 10 g/10 min to about 20 g/10 min.

The foam in accordance with the invention will generally comprise TPS in an amount ranging from about 1.5 wt % to about 50 wt %, polyolefin in an amount ranging from about 25 wt % to about 97 wt %, polyolefin wax in an amount ranging from about 0.05 wt % to about 4 wt %, ethylene vinyl alkanoate copolymer in an amount ranging from about 0.4 wt % to about 15 wt %, and ethylene acrylic copolymer in an amount ranging from about 0.6 wt % to about 18 wt %.

In one embodiment, the foam in accordance with the invention comprises TPS in an amount ranging from about 1.5 wt % to about 12 wt %, polyolefin in an amount ranging from about 76 wt % to about 97 wt %, polyolefin wax in an amount ranging from about 0.05 wt % to about 0.4 wt %, ethylene vinyl alkanoate copolymer in an amount ranging from about 0.4 wt % to about 3.2 wt %, and ethylene acrylic copolymer in an amount ranging from about 0.6 wt % to about 4.8 wt %.

In a further embodiment, the foam in accordance with the invention comprises TPS in an an amount ranging from about 30 wt % to about 50 wt %, polyolefin in an amount ranging from about 25 wt % to about 40 wt %, polyolefin wax in an amount ranging from about 1 wt % to about 4 wt %, ethylene vinyl alkanoate copolymer in an amount ranging from about 8 wt % to about 15 wt %, and ethylene acrylic copolymer in an amount ranging from about 12 wt % to about 18 wt %.

The foam in accordance with the invention may also comprise one or more additives. Such additives include those commonly employed in the art, for example, fillers, pigments, nucleating agents, permeability modifiers, anti-static agents, and processing aids.

Suitable fillers include calcium carbonate, talc, titanium dioxide and clays (e.g. montmorillonite).

Suitable anti-static agents include aliphatic amines and amides, phosphate esters, quaternary ammonium salts, polyethylene glycols, polyethylene glycol esters, and ethoxylated aliphatic amines.

Suitable pigments include calcium carbonate, carbon black, titanium dioxide, clay, talc and gypsum.

Suitable processing aids include calcium stearate, steric acid, magnesium stearate, sodium stearate, oleamide, stearamide and erucamide.

Suitable nucleating agents include both passive (i.e. do not decompose during melt processing) and active (i.e. do decompose during melt processing) nucleating agents. Examples of passive nucleating agents include inorganic compounds such as talc (magnesium silicate), silica, calcium carbonate, and clay. Examples of active nucleating agents include citric acid and sodium bicarbonate.

Permeability modifiers are generally used to stabilise the foam after being produced by moderating the rate at which the blowing agent gases escape from a given foam cell to match the rate of air uptake within the cell and thereby minimise foam shrinkage. Suitable permeability modifiers are typically fatty acid amides or esters and include glycerol monosteararte and stearyl stearamide.

Those skilled in the art will appreciate that certain additives may perform more than one role within a given foam product. For example, talc may function as a filler, pigment and a nucleating agent.

Such additives will generally be present in the foam in an amount ranging from about 0.05 wt % to about 4 wt %.

As will be discussed in more detail below, foam in accordance with the invention is prepared using a blowing agent. Although introduced to the foamable polymer composition when preparing the foam, those skilled in the art will appreciate that the blowing agent per se will typically not form a significant part of the ultimate foam product. In particular, the function of a blowing agent is to provide for a plurality of gas bubbles within the molten polymer, which in turn give rise to the cellular structure of the foam. The gas within each bubble or cell ultimately dissipates and is replaced with ambient atmosphere. Accordingly, the blowing agent per se will generally not form a significant part of the foam composition.

Having said this, depending upon the type of blowing agent used, there may be some minor residue of the agent retained within the foam.

A more detailed discussion on blowing agents that may be used in accordance with the invention is provided below.

The foam in accordance with the invention may be provided with a suitable bulk density for the intended application. For example, the foam may be provided with a density as measured by ASTM D-3575 as low as approximately 20 kg/m$^3$. Those skilled in the art will appreciate the process conditions that can be varied during the production of the foam so as to attain a desired foam density.

The foam in accordance with the invention can advantageously be produced with a uniform closed cell structure. Furthermore, foams in accordance with the invention can provide smooth and soft foam products that exhibit excellent cushioning and cushioning retention, making them particularly suited for packaging applications.

Foam in accordance with the invention may be provided in all manner of physical forms. For example, the foam may be provided in the form of a sheet, tube, plank, block, bead or other extruded profile shape.

The foam can advantageously be moulded or formed into a desired shape for the intended application.

The foam may also be provided with a crosslinked polymer structure.

Foam in accordance with the invention advantageously has a lower carbon footprint compared with conventional polyolefin foam. In particular, foam made entirely from LDPE has a greenhouse gas (GHG) emission value of about 2.80 kg $CO_2$ eq/kg compared with TPS which has a GHG emission value of about 1.62 kg$CO_2$ eq/kg. Accordingly, by incorporating TPS in foams according to the present invention, the resulting foam product inherently has a lower carbon footprint compared with that of conventional polyolefin foams.

Specific applications in which foams in accordance with the invention may be applied include packaging, vibration dampening, sealing interior wall joints, insulation, vertical and horizontal joint fillers.

The present invention also provides for a foamable polymer composition. By a "foamable" polymer composition is meant a polymer composition that is capable of being transformed into foam by being melt processed in the presence of a blowing agent. In other words, the foamable polymer composition in accordance with the invention may be the aforementioned foam composition prior to it actually being foamed.

The foamable polymer composition in accordance with the invention may comprise the same components as those described herein in respect of the foam composition, with such components being present in an amount that is the same as those described herein for the foam composition.

The foamable polymer composition may be in the form of an admixture of the respective components, or as a melt blend thereof. Where the foamable polymer composition is in the form of an admixture of the respective components, the starch component may be provided in the form of TPS and/or its constituent components. Where the foamable polymer composition is in the form of a melt blend of the respective components, by virtue of being a melt blend, the starch component will be in the form of TPS (i.e. melt blending TPS constituent components will inherently form TPS).

The foamable polymer composition in accordance with the invention therefore comprises TPS and/or its constituent components, polyolefin, polyolefin wax, ethylene vinyl alkanoate copolymer and ethylene acrylic copolymer.

The foamable polymer composition in accordance with the invention will generally comprise TPS and/or its constituent components in an amount ranging from about 1.5 wt % to about 50 wt %, polyolefin in an amount ranging from about 25 wt % to about 97 wt %, polyolefin wax in an amount ranging from about 0.05 wt % to about 4 wt %, ethylene vinyl alkanoate copolymer in an amount ranging from about 0.4 wt % to about 15 wt %, and ethylene acrylic copolymer in an amount ranging from about 0.6 wt % to about 18 wt %.

In one embodiment, the foamable polymer composition in accordance with the invention comprises TPS and/or its constituent components in an amount ranging from about 1.5 wt % to about 12 wt %, polyolefin in an amount ranging from about 76 wt % to about 97 wt %, polyolefin wax in an amount ranging from about 0.05 wt % to about 0.4 wt %, ethylene vinyl alkanoate copolymer in an amount ranging from about 0.4 wt % to about 3.2 wt %, and ethylene acrylic copolymer in an amount ranging from about 0.6 wt % to about 4.8 wt %.

In a further embodiment, the foamable polymer composition in accordance with the invention comprises TPS and/or its constituent components in an amount ranging from about 30 wt % to about 50 wt %, polyolefin in an amount ranging from about 25 wt % to about 40 wt %, polyolefin wax in an amount ranging from about 1 wt % to about 4 wt %, ethylene vinyl alkanoate copolymer in an amount ranging from about 8 wt % to about 15 wt %, and ethylene acrylic copolymer in an amount ranging from about 12 wt % to about 18 wt %.

In one embodiment, the foamable composition is provided in the form of a melt blended composition (e.g. pellets of melt blended composition, or molten extrudate of the melt blended composition) that may be extruded in the presence of a blowing agent.

The foam in accordance with the invention is produced by a method comprising melt processing the foamable polymer composition in the presence of a blowing agent. Such melt processing may be conveniently conducted using conventional extrusion equipment and techniques.

As used herein, the term "extrusion", or its variants such as "extruded", "extrudes", "extruding", etc, is intended to define a process of forcing molten polymer through a forming die. Generally, the foamable polymer composition will be melt processed and forced through a die using continuous extrusion equipments such as single screw extruders, twin screw extruders, and other multiple screw extruders.

Melt processing is typically conducted for sufficient time and at a suitable temperature to promote intimate mixing between the components of the composition being not processed. Those skilled in the art will appreciate that melt processing is generally performed within a suitable temperature range, and that this temperature range will vary depending upon the nature of the polymer(s) being processed.

The foamable polymer composition in accordance with the invention is formed into foam by melt processing it in the presence of a blowing agent. As used herein, a "blowing agent" is intended to mean a material or compound that may be melt processed with molten polymer and is capable of producing gas within the molten polymer so as to form a plurality of bubbles that give rise to the cellular structure of the foam.

Those skilled in the art will appreciate that there are a variety of blowing agents that can be used to produce foam. There is no particular limitation regarding the type of blowing agent that may be used in accordance with the invention.

The blowing agent may be a chemical blowing agent or a physical blowing agent. Those skilled in the art will appreciate that chemical blowing agents undergo a chemical reaction in the polymer, typically under conditions in which the polymer is molten, causing formation of a gas. Chemical blowing agents are generally low molecular weight organic compounds that decompose at a particular temperature and release gas such as nitrogen, carbon dioxide, or carbon monoxide. Examples of suitable chemical blowing agents include azo compounds such as azodicarbonamide and azobisformamide.

Physical blowing agents generally present as a gas at ambient conditions and are injected under pressure into the molten polymer stream to form a pressurised mixture. The mixture is then subjected to a pressure drop, for example by simply exiting the extruder die which causes the blowing agent to expand and form a plurality of bubbles in the molten polymer that give rise to the foam's cellular structure. A wide variety of physical blowing agents are well known to those skilled in the art and include helium, hydrocarbons, chlorofluorocarbons, hydrofluorocarbons, hydrochlorofluorocarbons, ethanol, water, nitrogen and carbon dioxide. Examples of common hydrocarbon physical blowing agents include propane, isobutene, n-butane and neopentane.

The amount of blowing agent introduced to the polymer melt will vary depending upon the desired density of the resulting foam product. Those skilled in the art will be able to readily adjust the amount of blowing agent to achieve the desired foam density. Generally the blowing agent will be introduced in an amount ranging from about 3 wt. % to about 30 wt. %, relative to the total mass of components in the composition being foamed.

The foamable composition that is foamed in accordance with the method of the invention may be prepared by any suitable means.

In one embodiment, the foamable polymer composition is prepared by melt processing a composition comprising TPS and/or its constituent components, polyolefin, polyolefin wax, ethylene vinyl alkanoate copolymer and ethylene acrylic copolymer.

The resulting melt processed product may be foamed directly by introducing into the melt process a foaming agent. In that case, the blowing agent may be introduced into the extruder that forms the melt, or multiple extruders may be employed where the melt is transferred to a second extruder and the blowing agent introduced to the melt in the second extruder, optionally with one or more other components (e.g. polyolefin). Alternatively, the melt processed product may be isolated (e.g. in the form of pellets) for subsequent use. In that case the foamable polymer composition will be in the form of a melt blended composition that can be subsequently melt processed alone, or in conjunction with one or more other components (e.g. polyolefin), in the presence of a blowing agent to form the foam.

By being a "melt blended" composition is meant that the composition is a melt blend of the stated components and not a mere admixture of the components. In other words, "melt blended composition" means that the components therein have previously been melt processed.

In one embodiment, a melt blended form the foamable polymer composition comprises TPS in an amount ranging from about 30 wt % to about 50 wt %, polyolefin in an amount ranging from about 25 wt % to about 40 wt %, polyolefin wax in an amount ranging from about 1 wt % to about 4 wt %, ethylene vinyl alkanoate copolymer in an amount ranging from about 8 wt % to about 15 wt %, and ethylene acrylic copolymer in an amount ranging from about 12 wt % to about 18 wt %.

Such a melt blended foamable polymer composition may be conveniently referred to herein as a masterbatch.

The melt blended composition comprising TPS, polyolefin, polyolefin wax, ethylene vinyl alkanoate copolymer and ethylene acrylic copolymer may itself be readily prepared by melt processing together TPS and/or its constituent components, polyolefin, polyolefin wax, ethylene vinyl alkanoate copolymer and ethylene acrylic copolymer.

In preparing the melt blended foamable polymer composition, the TPS may be prepared in advance from its constituent components and then melt processed with the polyolefin, polyolefin wax, ethylene vinyl alkanoate copolymer and ethylene acrylic copolymer. Alternatively, the TPS may be prepared in situ by melt processing its constituent components with the polyolefin, polyolefin wax, ethylene vinyl alkanoate copolymer and ethylene acrylic copolymer.

In one embodiment, the foamable polymer composition is prepared by melt processing with a polyolefin a melt blended composition comprising TPS, polyolefin, polyolefin wax, ethylene vinyl alkanoate copolymer and ethylene acrylic copolymer. The melt blended composition in accordance with that embodiment may comprise TPS in an amount ranging from about 30 wt % to about 50 wt %, polyolefin in an amount ranging from about 25 wt % to about 40 wt %, polyolefin wax in an amount ranging from about 1 wt % to about 4 wt %, ethylene vinyl alkanoate copolymer in an amount ranging from about 8 wt % to about 15 wt %, and ethylene acrylic copolymer in an amount ranging from about 12 wt % to about 18 wt % (i.e. the melt blended composition will be the aforementioned masterbatch).

In accordance with the embodiment outlined directly above, by melt processing the masterbatch with the polyolefin, the polyolefin is in effect functioning as a diluent for the components present within the masterbatch.

In one embodiment, the polyolefin and the melt blended composition comprising TPS, polyolefin, polyolefin wax, ethylene vinyl alkanoate copolymer and ethylene acrylic copolymer are melt processed together (to form a foamable polymer composition) in an amount of about 95 wt % to about 60 wt % and about 5 wt % to about 40 wt %, respectively. For example, 5 wt % of the melt blended composition may be diluted with about 95 wt % polyolefin, or 40 wt % of the melt blended composition may be diluted with about 60 wt % polyolefin.

Where a polyolefin and a melt blended composition comprising TPS, polyolefin, polyolefin wax, ethylene vinyl alkanoate copolymer and ethylene acrylic copolymer are melt processed together to form the foamable polymer composition, the resulting foamable polymer composition will generally be formed directly into a foam by the introduction of a blowing agent.

In a further embodiment, the melt blended composition comprising TPS, polyolefin, polyolefin wax, ethylene vinyl alkanoate copolymer and ethylene acrylic copolymer is itself prepared by melt processing together TPS and/or its constituent components, polyolefin, polyolefin wax, ethylene vinyl alkanoate copolymer and ethylene acrylic copolymer.

In yet a further embodiment, the melt blended composition comprising TPS, polyolefin, polyolefin wax, ethylene vinyl alkanoate copolymer and ethylene acrylic copolymer is itself prepared by melt processing together about 30 wt % to about 50 wt % TPS and/or its constituent components, about 25 wt % to about 40 wt % polyolefin, about 1 wt % to about 4 wt % polyolefin wax, about 8 wt % to about 15 wt % ethylene vinyl alkanoate copolymer, and about 12 wt % to about 18 wt % ethylene acrylic copolymer.

In one embodiment, up to about 5 wt % of the melt blended composition comprising TPS, polyolefin, polyolefin wax, ethylene vinyl alkanoate copolymer and ethylene acrylic copolymer is melt processed with polyolefin so as to form the foamable polymer composition (with the amount of melt blended composition and polyolefin adding up to 100%).

In another embodiment, up to about 25 wt % of the melt blended composition comprising TPS, polyolefin, polyolefin wax, ethylene vinyl alkanoate copolymer and ethylene acrylic copolymer is melt blended with polyolefin to form the foamable polymer composition (with the amount of melt blended composition and polyolefin adding up to 100%).

In a further embodiment, up to about 40 wt % of the melt blended composition comprising TPS, polyolefin, polyolefin wax, ethylene vinyl alkanoate copolymer and ethylene acrylic copolymer is melt processed with polyolefin in order to form the foamable polymer composition (with the amount of melt blended composition and polyolefin adding up to 100%).

The polyolefin that is melt processed with the melt blended composition may be selected from those polyolefins herein described. Generally, the polyolefin that is melt processed with the melt blended composition will be predominantly the same (i.e. >50 wt %) as the polyolefin that is used to prepare the melt blended composition. For example, if the melt blended composition is predominantly prepared using LDPE, then the melt blended composition will generally be melt processed with LDPE.

The present invention also provides for an article comprising or produced from foam according to the present invention. The article may be in the form of a foam sheet, foam tube, foam plank, foam block, foam bead or other extruded profile foam shape.

The foam in accordance with the invention may also be provided with a crosslinked polymer structure. A crosslinked polymer structure can provide the foam with improved physical properties. Techniques for crosslinking polyolefins are well known in the art and can advantageously be employed in the present invention. For example, the foam may be subjected to electron beam radiation, or the foamable polymer composition may be melt processed in the presence of the blowing agent and a peroxide.

Embodiments of the invention are further described with reference to the following non-limiting examples.

EXAMPLES

Example 1

Foamable Polymer Composition

A foamable polymer composition in accordance with the present invention was prepared by melt processing the components shown below in Table 1. For convenience, this melt blended composition is herein after referred to as masterbatch 1 (MB1).

TABLE 1

Component used in the preparation of a foamable polymer composition (MB1)

| Material | Supplier/specifications | Amount (kg) | Amount (%) |
|---|---|---|---|
| Starch | Zhucheng Starch Group | 50 | 28.5% |
| Glycerol | Malaysian Oil Company, GLY 995 | 25 | 14.2% |
| EAA | Dow Primacor 4630 | 25 | 14.2% |
| EVA | Dupont Elvax, VA14% | 20 | 11.5% |
| LDPE | Sinopec 1F7B | 30 | 17.1% |
| LLDPE | Daqing Petrochemical 7042 | 23 | 13.1% |
| PE WAX | Sinochem Co. Molecular weight (Mn) 5000: melting point approx. 100° C. | 2.5 | 1.4% |

Preparation of the MB1 Foam Masterbatch:

50 kg of corn starch having a water content of less than 1 wt. %, 25 kg of glycerol, 25 kg of ethylene acrylic acid (EAA) (9% acid, MFI=20), 20 kg of EVA (DuPont Elvax 14% VA content), 30 kg LDPE (MFI=7, density=0.920 g/cc), 23 kg LLDPE (Daqing Petrochemical, MFI=2, density=0.918 g/cc) and 2.5 kg PE wax (Mn 5000, mp. 100 deg. C.) were melt mixed in a ZSK-65 Twin Screw Extruder (L/D=48:1). Prior to melt mixing these components, the solid materials were dry blended first in a high speed mixer for 15 mins and the liquid materials then added to provide for a uniform distribution of all components. The temperature profile of the extruder was set at 160(I) (hopper), 165 (II), 175 (III), 175 (IV), 170 (V) and 165 deg. C. (VI) (die) to give a controlled melt temperature range of 155-165° C. The rotation speed of the screw was set at 330-350 rpm. A vacuum of −0.11 bar was applied during extrusion. The composition melt was extruded as a strand, air cooled and cut into pellets at a rate of 150 kg/hr. The masterbatch was found to have a MFI of >2 g/10 min at 190° C./2.16 kg, a density of 1.1 kg/dm3 and a water content of less than 0.6 wt. %.

Example 2

Preparation of the Foam Using MB1 Pellets Formed in Example 1

To prepare the foam, MB1 pellets formed in Example 1 (5 wt. %, 12 wt. % and 25 wt. %), glycerol monostearate (GMS—3 wt. %), azodicarbonamide, and LDPE (SABIC® 2004TX33, MFI 4—in an amount to make up 100 wt. % with the % MB1, azodicarbonamide and GMS used) were melt processed in a 75 mm double screw co-rotating (Parallel co-rotating Double-Screw) Extruder, L/D: 48:1, Temperature: 150-175° C., Speed: 330-350 rpm production output: 250 kg/h. The resultant foam has an expansion ratio of 25-35 times. Properties of the foams produced are shown below in Tables 2 and 3.

Physical Properties Foam Produced:

TABLE 2

Medium Density Foam Properties

| Properties | | | |
|---|---|---|---|
| % MB1 | 0% | 5% | 12% |
| Foam density | 32 kg/m3 | 31.5 kg/m3 | 30.9 kg/m3 |

TABLE 2-continued

Medium Density Foam Properties

| Properties | | | |
|---|---|---|---|
| ASTM D-3575 Suffix W | | | (lighter) |
| Processing behaviour | good | good | Excellent (wider process window) |
| % loss of compression after 50% compression ASTM D-3575 Suffix B | most | medium | least (better) |
| Cell structure | uniform | uniform | uniform |
| Foam Colour | natural | natural | natural (no yellowing) |

TABLE 3

Low Density Foam Properties

| Properties | 0% MB1 (comparative) | 25% MB1 |
|---|---|---|
| Density ASTM D-3575 Suffix W | 26 kg/m3 | 25.9 kg/m3 |
| Foam Colour | natural | natural (no yellowing) |
| Cell structure | uniform | uniform |
| Cell count (cells/inch) (MD) | 24 | 19 |

Example 3

Preparation of Polyethylene Foam Plank Using MB1 Melt

In this example, a foam in accordance with the invention was prepared in a tandem extrusion process. The process consisted of a first single screw extruder having a feed section, a compression zone, a metering zone, several heating zones and a mixing zone. In this first extruder a foamable polymer composition was melted, compressed, mixed and homogenised. The melt was then transferred under pressure into a second single screw extruder in which a physical blowing agent was injected under high pressure to prevent it from vaporising and expanding. Then the blend was intimately mixed and cooled down to foaming a temperature of 110-112° C. A rectangular slit die was used to shape the melt stream which started to foam freely as it exited the die forming a foam plank of approximately 25 mm.

To prepare the foams, the MB1 composition outlined above was melt processed in the first extruder, with the resulting melt blend being passed into the second extruder at a rate to provide for either 7.5 wt. % or 15 wt. % of the total amount of components introduced into the second extruder. Also introduced into the second extruder was iso-butane blowing agent (9%), permeability modifier GMS (0.8%), nucleating agent Hydrocerol CF40 from Clariant (0.3%), and LDPE (Sabic LDPE 2102TX00) with MFI=2 g/10 min in an amount to make up 100 wt. % with the % MB1, iso-butane, GMS and Hydrocerol used. Properties of the foams produced are shown below in Tables 4 and 5.

Physical Properties Foam Produced:

TABLE 4

Medium Density Foam Properties

| Properties | | | |
|---|---|---|---|
| % MB1 | 0% | 7.5% | 15% |
| Foam density ASTM D-3575 Suffix W | 32.1 kg/m3 | 31.7 kg/m3 | 29.4 kg/m3 (lighter) |
| Processing behaviour | good | good | Excellent (wider process window) |
| Cell structure | uniform | uniform | uniform |
| Foam Colour | natural | natural | natural |
| average cell size (mm) | 1.5 | 1.6 | 1.9 |
| % loss of compression after 50% compression ASTM D-3575 Suffix B | most | medium | least (better) |

TABLE 5

Low Density Foam Properties

| Properties | 0% MB1 (comparative) | 25% MB1 |
|---|---|---|
| Density ASTM D-3575 Suffix W | 26 kg/m3 | 25.9 kg/m3 |
| Foam Colour | natural | natural (no yellowing) |
| Cell structure | uniform | uniform |
| Cell count (cells/cm) (MD) | 9.5 | 7.5 |

Example 4

Preparation of Rigid High Density Polyethylene Foam Plank Using MB1

A rigid high density foam was prepared using MB1 pellets prepared according to Example 1. The MB1 pellets were melt processed in a similar manner to that outlined in Example 2 using the formulation outlined below.

Formulation:
LDPE, SABIC® LDPE 2102TX00, MFI=2
MB1 as per Example 1, 30%
blowing agent azodicarbonamide (Clariant AB40E): 12%
zinc oxide: 0.2% (tbc)
GMS; 1.5%

The foam was found to have the following properties.

Properties:
cell size: 0.2 mm
density: 100 kg/m3

The reference in this specification to any prior publication (or information derived from it), or to any matter which is known, is not, and should not be taken as an acknowledgment or admission or any form of suggestion that prior publication (or information derived from it) or known matter forms part of the common general knowledge in the field of endeavour to which this specification relates.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The invention claimed is:

1. A foam comprising thermoplastic starch, polyolefin, polyolefin wax having a melting point or melting range greater than about 95° C., ethylene vinyl alkanoate copolymer, and ethylene acrylic copolymer.

2. The foam according to claim 1, wherein the thermoplastic starch is present in an amount ranging from about 1.5 wt % to about 50 wt %, the polyolefin is present in an amount ranging from about 25 wt % to about 97 wt %, the polyolefin wax having a melting point or melting range greater than about 95° C. is present in an amount ranging from about 0.05 wt % to about 4 wt %, the ethylene vinyl alkanoate copolymer is present in an amount ranging from about 0.4 wt % to about 15 wt %, and the ethylene acrylic copolymer is present in an amount ranging from about 0.6 wt % to about 18 wt %.

3. The foam according to claim 1 which has a closed cell structure.

4. The foam according to claim 1, wherein the thermoplastic starch is derived from corn starch, potato starch, wheat starch, soy bean starch, tapioca starch, hi-amylase starch or combinations thereof.

5. The foam according to claim 1, wherein the polyolefin is selected from low density polyethylene (LDPE) and linear low density polyethylene (LLDPE).

6. The foam according to claim 1, wherein the polyolefin wax having a melting point or melting range greater than about 95° C. is polyethylene wax.

7. The foam according to claim 1, wherein the polyolefin wax having a melting point or melting range greater than about 95° C. has a melt viscosity at 120° C. ranging from about 100 mm$^2$/s to about 1200 mm$^2$/s as measured according to ASTM 2162.

8. The foam according to claim 1, wherein the ethylene vinyl alkanoate copolymer is selected from ethylene vinyl acetate, ethylene vinyl propionate, ethylene vinyl butyrate, ethylene vinyl isobutyrate, ethylene vinyl valerate, ethylene vinyl caproate, and combinations thereof.

9. The foam according to claim 1, wherein the ethylene acrylic copolymer is selected from ethylene acrylic acid, ethylene methacrylic acid, ethylene methyl (meth)acrylate, ethylene ethyl (meth)acrylate, ethylene propyl (meth)acrylate, ethylene N-butyl meth(acrylate), ethylene iso-butyl (meth) acrylate, ethylene 2-ethyl hexyl (meth)acrylate, and combinations thereof.

10. A sheet, tube, plank, block or bead of foam comprising the foam of claim 1.

11. A method of producing a foam, the method comprising melt processing a foamable polymer composition in the presence of a blowing agent, wherein the foamable polymer composition comprises thermoplastic starch and/or its constituent components, polyolefin, polyolefin wax having a melting point or melting range greater than about 95° C., ethylene vinyl alkanoate copolymer, and ethylene acrylic copolymer.

12. The method according to claim 11, wherein the foamable polymer composition is prepared by melt processing with a polyolefin a melt blended composition comprising thermoplastic starch, polyolefin, polyolefin wax having a melting point or melting range greater than about 95° C., ethylene vinyl alkanoate copolymer, and ethylene acrylic copolymer.

13. The method according to claim 12, wherein said polyolefin and said melt blended composition comprising thermoplastic starch, polyolefin, polyolefin wax having a melting point or melting range greater than about 95° C., ethylene vinyl alkanoate copolymer and ethylene acrylic copolymer are melt processed together to form a foamable polymer composition in an amount of about 95 wt % to about 60 wt % and about 5 wt % to about 40 wt %, respectively.

14. The method according to claim 12, wherein said melt blended composition comprising thermoplastic starch, polyolefin, polyolefin wax having a melting point or melting range greater than about 95° C., ethylene vinyl alkanoate copolymer and ethylene acrylic copolymer comprises the thermoplastic starch in an amount ranging from about 30 wt % to about 50 wt %, the polyolefin in an amount ranging from about 25 wt % to about 40 wt %, the polyolefin wax having a melting point or melting range greater than about 95° C. in an amount ranging from about 1 wt % to about 4 wt %, the ethylene vinyl alkanoate copolymer in an amount ranging from about 8 wt % to about 15 wt %, and the ethylene acrylic copolymer in an amount ranging from about 12 wt % to about 18 wt %.

15. A foamable polymer composition comprising thermoplastic starch and/or its constituent components, polyolefin, polyolefin wax having a melting point or melting range greater than about 95° C., ethylene vinyl alkanoate copolymer, and ethylene acrylic copolymer.

16. A foamable polymer composition comprising thermoplastic starch and/or starch and one or more plasticizers, polyolefin, polyolefin wax having a melting point greater than about 95° C., ethylene vinyl alkanoate copolymer, and ethylene acrylic copolymer.

* * * * *